(12) United States Patent
Daniel

(10) Patent No.: US 8,249,254 B1
(45) Date of Patent: Aug. 21, 2012

(54) APPARATUS, SYSTEM AND METHOD FOR REPORTING A PLAYER'S GAME PLAYS DURING A GAME

(75) Inventor: Isaac Sayo Daniel, Miami, FL (US)

(73) Assignee: ID Coach, LLC, Miami, FL (US)

(*) Notice: Subject to any disclaimer, the term of this patent is extended or adjusted under 35 U.S.C. 154(b) by 586 days.

(21) Appl. No.: 12/454,162

(22) Filed: May 13, 2009

Related U.S. Application Data

(63) Continuation-in-part of application No. 12/286,476, filed on Sep. 30, 2008, and a continuation-in-part of application No. PCT/US2008/013755, filed on Dec. 16, 2008, and a continuation-in-part of application No. 12/317,640, filed on Dec. 23, 2008.

(51) Int. Cl.
*H04N 7/167* (2006.01)

(52) U.S. Cl. ......... 380/239; 380/270; 380/251; 380/255

(58) Field of Classification Search .................. 380/239, 380/270, 251, 255
See application file for complete search history.

(56) References Cited

U.S. PATENT DOCUMENTS

| | | | |
|---|---|---|---|
| 5,646,589 A | 7/1997 | Murray et al. | |
| 6,385,317 B1 * | 5/2002 | Rix et al. | 380/258 |
| 6,652,284 B2 * | 11/2003 | August et al. | 434/247 |
| 7,171,553 B2 * | 1/2007 | Rix et al. | 713/155 |
| 7,424,304 B2 | 9/2008 | Inselberg | |
| 7,466,824 B2 * | 12/2008 | Dobranski et al. | 380/260 |
| 7,702,101 B2 * | 4/2010 | Malcolm et al. | 380/37 |
| 7,785,197 B2 * | 8/2010 | Smith | 463/30 |
| 2002/0023209 A1 * | 2/2002 | Domstedt et al. | 713/160 |
| 2002/0065097 A1 * | 5/2002 | Brockenbrough et al. | 455/552 |
| 2002/0132211 A1 | 9/2002 | August | |
| 2006/0025214 A1 | 2/2006 | Smith | |
| 2007/0143382 A1 | 6/2007 | Luster | |
| 2009/0022315 A1 * | 1/2009 | Leung | 380/255 |
| 2010/0161984 A1 * | 6/2010 | Pauker et al. | 713/168 |

FOREIGN PATENT DOCUMENTS

WO   WO 2008/032315 A   3/2008

* cited by examiner

*Primary Examiner* — Krisna Lim
(74) *Attorney, Agent, or Firm* — Carol N. Green, Esq.

(57) ABSTRACT

The present invention is directed to an apparatus, system and method for reporting a player's game plays during a game with input from fans on the player's performance, and more specifically allowing each player to dynamically transmit information regarding the player's game plays to a portable remote terminal or central processor from which real-time statistical information may be obtained and wherein the player, coach(es) and/or other teammates may review the statistical information to formulate and implement appropriate game strategies to be effected on the field or court.

30 Claims, 7 Drawing Sheets

APPARATUS, SYSTEM AND METHOD FOR REPORTING A PLAYER'S GAME PLAYS DURING A GAME

PRIORITY CLAIM

This patent application is a continuation-in-part of, and claims priority to: U.S. Non-Provisional patent application Ser. No. 12/286,476 titled An Apparatus for Improving In-Game Communications During a Game filed Sep. 30, 2008; PCT Application Serial No. PCT/US2008/013755 titled An Apparatus for Improving In-Game Communications During a Game filed on 16 Dec. 2008 and United States Continuation in Part Non-Provisional patent application Ser. No. 12/317,640 titled System and Method of Improving In-game Communications During a Game filed Dec. 23, 2008. The entire disclosures of the afore-mentioned patent applications are incorporated by reference as if fully stated herein.

FIELD OF THE INVENTION

The present invention is directed to an apparatus, system and method for reporting a player's game plays during a game with input from fans on the player's performance, and more specifically allowing each player to dynamically transmit information regarding the player's game plays to a portable remote terminal or central processor from which real-time statistical information may be obtained and wherein the player, coach(es) and/or other teammates may review the statistical information to formulate and implement appropriate game strategies to be effected on the field or court.

BACKGROUND OF THE INVENTION

Some sports allow coaches and/or individual players to coach a player during the game, e.g. basketball, baseball, soccer, volleyball, football, hockey, golf, horse racing, boxing, wrestling and many others. Most of the proposed game strategies offered by the coaches during the game are based on the coach's visual and/or auditory impressions. However, the majority of these sports have not been able to capitalize on technological advancements in the communications field as coaching still relies heavily on the coach's in-game impressions.

The problem is that when several players are on the field it is difficult to monitor every single play for each player as well as the opposing team's game plays. As such, a coach often misses an opportunity to provide valuable individual feedback during the game and at best focuses on the most glaring errors or offensive strategies. For example, in soccer, the game is played by two teams of eleven (11) players for two half-time periods of forty-five (45) minutes each, with one fifteen (15) minute break between the first and second half. During any 45 minute half-time period there are several game plays by each of the 11 players on the field as the ball is constantly in motion with the players covering the entire the field to create goal scoring opportunities while preventing the opposing team from scoring. Even the very best of coaches will find it challenging to monitor each and every move made by their own 11 players during the game, as well as the opposing team's 11 players for any 45 minute half-time period.

Coaches often attempt to overcome this limitation by creating an audiovisual record of the game. Except, this method of review is not efficient, as capturing each and every game play for each player for the entire game can be quite time consuming, requiring several hours and/or days to complete. During the game, e.g. the half-time period in soccer, there simply isn't enough time to provide a thorough review and critique for each player's game plays. Thus, there is a need for an apparatus, system and method providing for the transmissions of each player's game plays in real-time in a format that is useful, and easily interpreted by the coaches that can be used as a coaching tool during the game.

Generally, fans throughout have their own opinions on the players' game plays and often wished their opinions could be heard and/or incorporated in the coaching decisions during the game. Understandably, the fans' opinions may not carry the same weight as the coach's, but it would be helpful for both the players and coaches to know the fans' perspective as fans often see bad game plays and missed opportunities that a coach fully engrossed in coaching, may have missed. Except currently, fans are relegated to shouting loud comments during a game to communicate their opinions and/or feedback on varied game plays. These opinions and/or feedback are sometimes captured post game by sports writers in reporting the game. However, these post game written opinions have zero impact in affecting the game's outcome. Thus, there is a need to capture sports fans' opinions and/or feedback during a game such that the opinions may be organized and tabulated in an appropriate format that is useful to the coach and/or players during the game.

This invention satisfies these long felt needs and solves the foregoing problems that the prior art has been unable to solve in a new and novel manner.

SUMMARY OF THE INVENTION

The present invention relates generally to a game apparatus, system and method for recording at least one player's game play during a game or sporting event, where the game apparatus comprises of a flexible band with a primary aperture formed therein allowing for the game apparatus to be worn, and includes a protective top cover having a smooth contour, which is of the same proportion as a middle portion, with no sharp edges, where the top cover and the middle portion are enclosed by a rear cover forming a housing for the game apparatus' electronic elements housed therein, e.g. an electronic circuit assembly, antenna, power supply and communication means housed therein. The top cover, middle portion and housing are all positioned on an upper portion of the flexible band.

The game apparatus may be used for at least one of the following games: basketball, baseball, soccer, volleyball, football, hockey, tennis, golf, horse racing, boxing, and wrestling. A game play may include but is not limited to: shooting a ball through a hoop, dribble, a layup, a dunk, scoring, hitting a ball with a club, a strike, a homerun, running to a base, scoring a goal, a kick, running with a ball, running alongside a ball, running in front of a ball, running behind a ball, passing a ball, trip, fall, a spike, a volley, hit, a punt, hitting a puck, a stroke, a putt, a box, a jab, making contact with a ball, or any other movement that a player may execute during the course of playing a game or sport. In one embodiment of the invention, the game apparatus includes audiovisual recording equipment, as such, the player and or the appropriate personnel have a visual play by play report of each game plays.

The electronic circuit assembly includes a circuit board having a microprocessor positioned thereon and electrically connected to the communication means. The microprocessor records each game play during the game and encrypts the recorded game play forming an encrypted signal containing the game play information for transmission to a central processor, a portable remote terminal ("PRT") and/or a wireless reader, which may be on or off the field at a remote location and/or along the perimeter of the field. The communication means transmits the encrypted signal containing the game play information to the central processor, a portable remote terminal and/or wireless reader, where the player's game play statistics are generated from the game play information and stored thereon, with a statistical display routed to the PRT's display element. The PRT may comprise of a cell phone, computer, laptop, Blackberry, IPhone, personal digital assistant ("PDA") and/or any other wireless LAN ("WLAN") communication devices that are known and readily used in the arts.

According to a method for reporting a player's game plays during a game which includes providing at least one player with a game apparatus worn by the player during a game, wherein the game apparatus records each game play and encrypts the recorded game play forming an encrypted signal containing the game play information for transmission. Fans may also submit their input for a player's game play, which is similarly transmitted as an encrypted signal containing the game play information.

During the game the central processor and/or the PRT receives the encrypted signal containing the game play information as transmitted by the game apparatus being worn by the player during the game, and any additional encrypted signal containing a player's game play information for that particular player, if any, from a fan's mobile operating unit. The fans' mobile operating units may include but is not limited to a cell phone, computer, laptop, Blackberry, IPhone, PDA and/or other WLAN communication devices that are known and readily used in the arts to transmit and/or receive wireless communications. The fan based encrypted signal containing the game play as transmitted from a fan's mobile operating unit may have an additional marker and/or indicator such that the system of the invention can appropriately process this encrypted signal as fan based input as opposed to the input received from the player wearing the game apparatus.

In another embodiment of the invention, the central processor adds a marker to the encrypted signal containing the game play transmitted from the fan's mobile operating units such that it may be appropriately processed. The encryption of the signals provides for secure transmissions such that the game plays for a particular player are routed to the appropriately coach(es) and/or other approved personnel.

The central processor and/or the PRT's microprocessor decrypts each encrypted signal containing the game play information, i.e. the encrypted signals transmitted from the player's game apparatus and/or the fans input; and converts the encrypted signal containing the game play information into statistical data for the player, routing the statistical data for the player to the PRT's display element, where the statistical data may be displayed on the PRT's display element in text, visual, graphical or statistical format or any other format that is well known and used in the arts for statistical displays.

In one embodiment of the invention, the system and method of reporting the game play's for a player comprises of providing a ball, which includes an identification tag that utilizes radio transmissions for wireless communications with the game apparatus being worn by the player during the game, and wherein the identification tag is used for tracking a plurality of players' game plays during the game that are made in conjunction with the ball and read by a wireless reader within the game apparatus, forming an encrypted signal containing the game play information for the player for transmission to the PRT and/or central processor. In that embodiment the PRT and/or central processor receives and, decrypts the encrypted signal containing the game play information for the player, converting the decrypted signal containing the game play information into statistical data for display on the portable remote terminal's display element.

In an alternate embodiment of the invention, the system and method of reporting the game play's for a player comprises of providing an identification tag for the game apparatus being worn by the player during the game, that utilizes radio transmissions for wireless communications with a wireless reader, wherein the identification tag is used for tracking each game play for the player, which is transmitted as the encrypted signal containing the game play information for the player to at least one wireless reader that may be located on or off the field. In that embodiment the encrypted signal containing the game play information for the player is routed to the portable remote terminal, where it is decrypted and converted into statistical data for display on the portable remote terminal's display element.

In one embodiment of the invention, the game apparatus includes an extended flap that is provided with closing means and cooperative closing means which may comprise of any one or more of the following: snaps, fasteners, buttons, buttonholes, a plurality of miniature filament hook elements and a plurality of miniature filament loop elements. The plurality of miniature monofilament hook elements cooperates with the plurality of miniature monofilament loop elements for detachable engagement and are more commonly known as Velcro®, which is well known and used in the arts for detachably securing various fabrics and materials. In yet another embodiment of the invention, the game apparatus is made from an elasticized band sized to fit the wearer's body part, e.g. calf, thigh, wrist, arm, etc.

The game apparatus' primary aperture is able to receive any one or more of the following: an individual's body parts and or an article of clothing. In an alternate embodiment of the invention, the game apparatus further comprises of at least one loop on a lower exterior surface for allowing an article of clothing to pass therethrough, where the article of clothing may comprise of any one or more of the following: a belt, an ankle band, headband and or a thigh band. As such, the game apparatus may be worn independently as any one of the following: a wristband, calf band, ankle band, neckband, armband, waistband, knee band, thigh band, with a belt or in any other form on the player's body that facilitates easy access and reporting.

The game apparatus also includes a circuit board, power supply, microprocessor, antenna and wiring for the recording and transmission of at least one player's game play to a PRT. The circuit comprises of a circuit board having a microprocessor positioned thereon and electrically connected to the communication means for transmitting an encrypted signal containing the game play to the receiving means of a PRT. The game apparatus' communication means communicates with the PRT via short range wireless protocol. The communication means uses any one or more of the following wireless communications: radio transmissions, microwave transmissions, broadband wireless data transmissions and/or satellite transmission, using any one or more of the following wireless protocol: Blue Tooth, ZigBee, 802.11 series, RFID tags or any other short range wireless protocol that is well known and used in the arts and other future short range wireless protocol suitable for transmitting data over a short distance. Both the communication means and the PRT's receiving means may comprise of a transceiver, e.g. a ZigBee transceiver, with integrated radio and shared antenna, or direct conversion receivers; digital radio receivers; super heterodyne receivers; or any other receivers or transceivers that are well known and used in the arts.

The middle portion and the protective top cover of the invention may have any one of the following shapes: circular, oblong, rectangular, irregular geometric shape or any other shape that is well known and used in the arts. Said protective top cover protects the middle portion with the varied electronic elements within, e.g. the microprocessor and circuits positioned therein. As such, the protective top cover is formed from a semi-rigid material to prevent breakage, damage and injury to the player. Additional protection may be derived in certain embodiments from the extended flap, which may include additional padding, which may comprises of foam, fabric, rubber or any other materials used in the arts suitable for providing like protection. The game apparatus' extended flap is sturdy, resilient and able to absorb shock associated with at least one of the following: football tackle, kick, sliding into base, hit by a pitch, a bat, a batted ball, a clubbed ball and/or heavy body contact.

In an alternate embodiment of the invention, the game apparatus is provided with a display element which may be a liquid crystal display ("LCD") or light emitting diode ("LED") type, plasma, touch screen or other types of displays that are well known and used in the arts. The display element may be used to display an incoming transmission from the PRT, e.g. an intended game play instruction either in text and/or visual format. The display element may be located in the housing where it is electrically connected to the microprocessor and may be programmed to flash a light thereon on receipt of an encrypted signal of an intended game play instruction for execution on the field during a game.

In yet another embodiment of the invention, the game apparatus may include speech recognition means comprising of a user interface which includes an audio receiving circuit capable of receiving radio (RF and/or VHF) signals at predetermined frequencies and/or additional hardware complete with circuitry to effectuate the same.

While the invention has been described in conjunction with soccer, it is understood that the game apparatus may be used for several other games or sporting events that may include but is not limited to: basketball, baseball, soccer, volleyball, football, hockey, golf, horse racing, boxing, wrestling, other games that allows players to receive in-game communications or coaching instructions during the game, as well as any game or sport for which a player's physical game plays may be recorded for review.

A primary objective of the present invention is to provide a game apparatus and method for improving in-game communications between players and/or coaches during a game that overcomes the limitations of the prior art.

A primary objective of the present invention is to provide a game apparatus for providing speedy real-time in-game statistics for each player during a game that overcomes the limitations of the prior art.

Another objective of the invention is to provide the ability for player's and or coaches to review a player's game plays during the game.

Still further, another objective of the present invention is to allow fans to provide their input and commentary regarding a player's or a plurality of players' performance(s) during the game in a meaningful and useful manner that is helpful to the player, coach(es) and or other teammates.

Still yet another objective of the present invention is to provide a game apparatus wherein the top cover is formed from a semi-rigid transparent material.

Still yet another objective of the present invention is to provide a game apparatus which includes a circuit board, power supply, microprocessor, antenna and wiring.

Another objective of the present invention is to provide a game apparatus wherein said circuit board, power supply and microprocessor are positioned in the middle portion of a game apparatus, which is enclosed within a rear cover forming a housing.

Additional objectives of the present invention will appear as the description proceeds.

The foregoing and other objectives and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Further objectives and advantages of the present invention may be derived by referring to the detailed description and claims when considered in connection with the Figures, wherein like reference numbers refer to similar items throughout the Figures.

Figure 5:
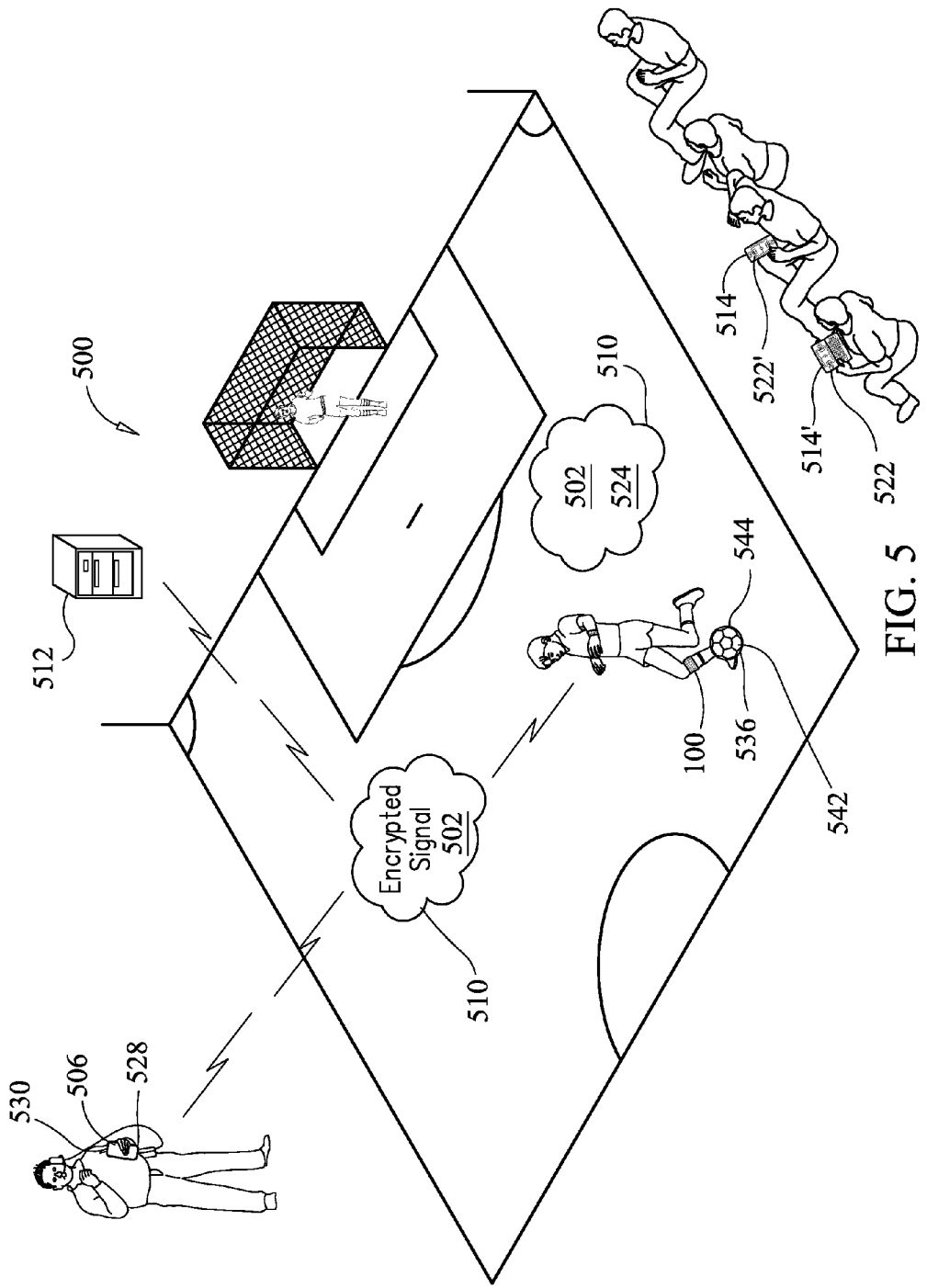

FIG. 5 an illustrative view of a system of the invention according to an embodiment of the invention.

Figure 6:
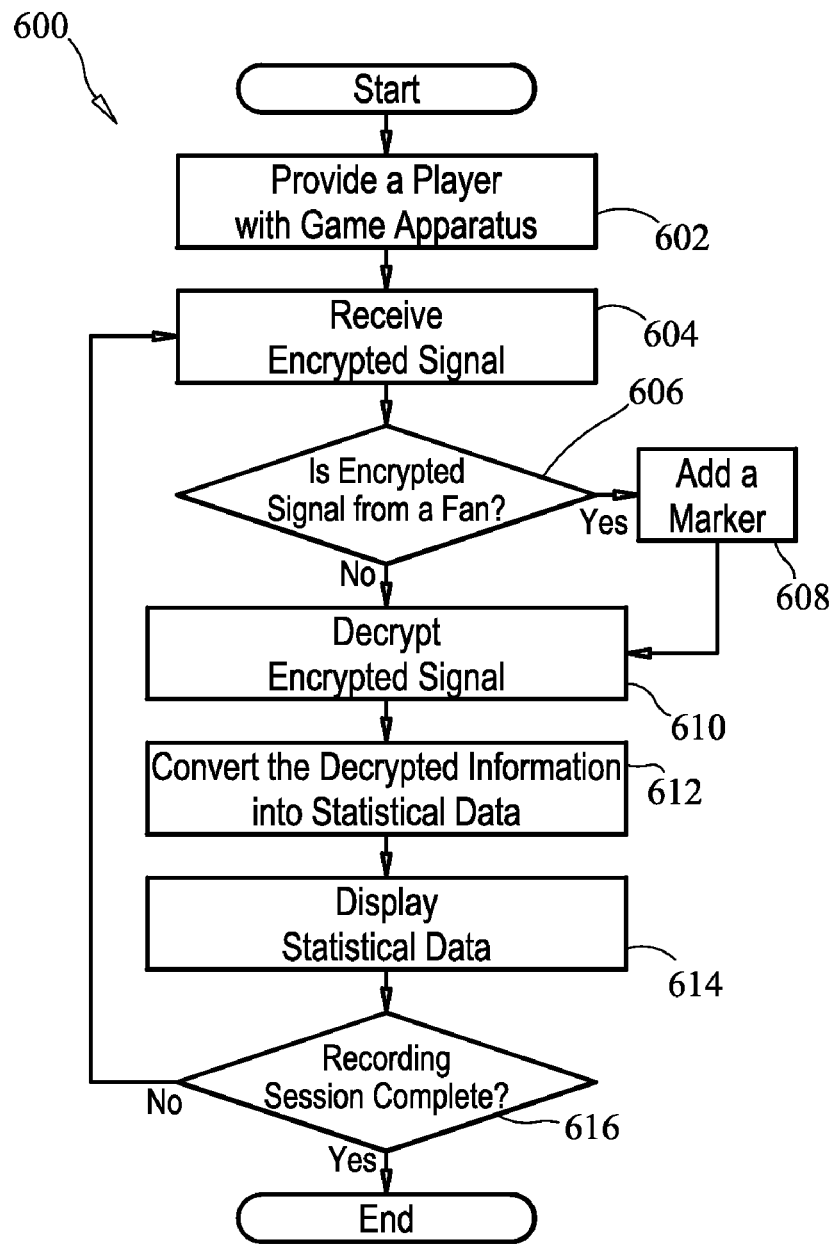

FIG. 6 is a flowchart illustrating a method for reporting a player's game plays during a game according to an embodiment of the present invention.

Figure 7:
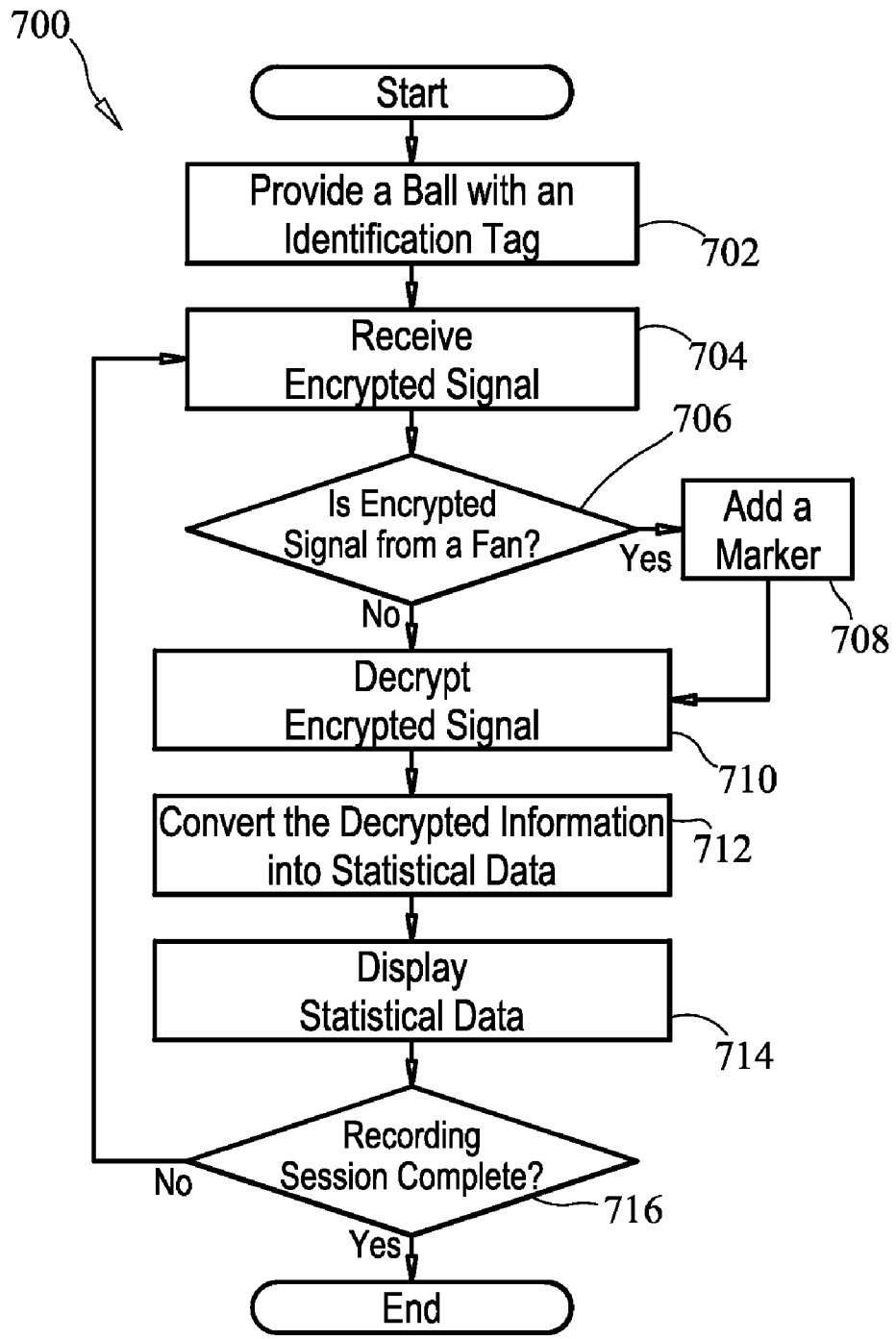

FIG. 7 is a flowchart illustrating an alternate method of reporting a player's game plays during a game according to an embodiment of the present invention.

Figure 8:
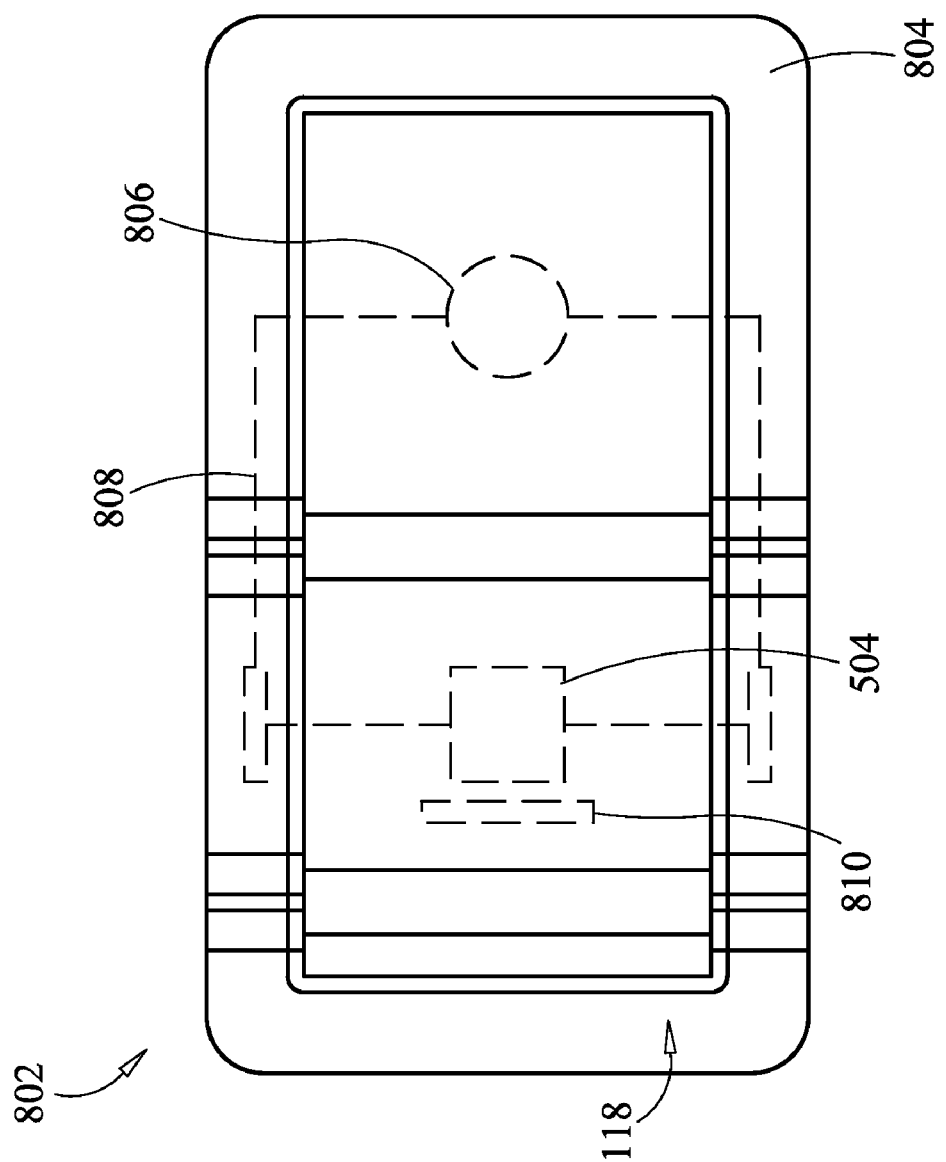

FIG. 8 is an illustrative view of a circuit assembly of the game apparatus according to an embodiment of the present invention.

Figure 9:
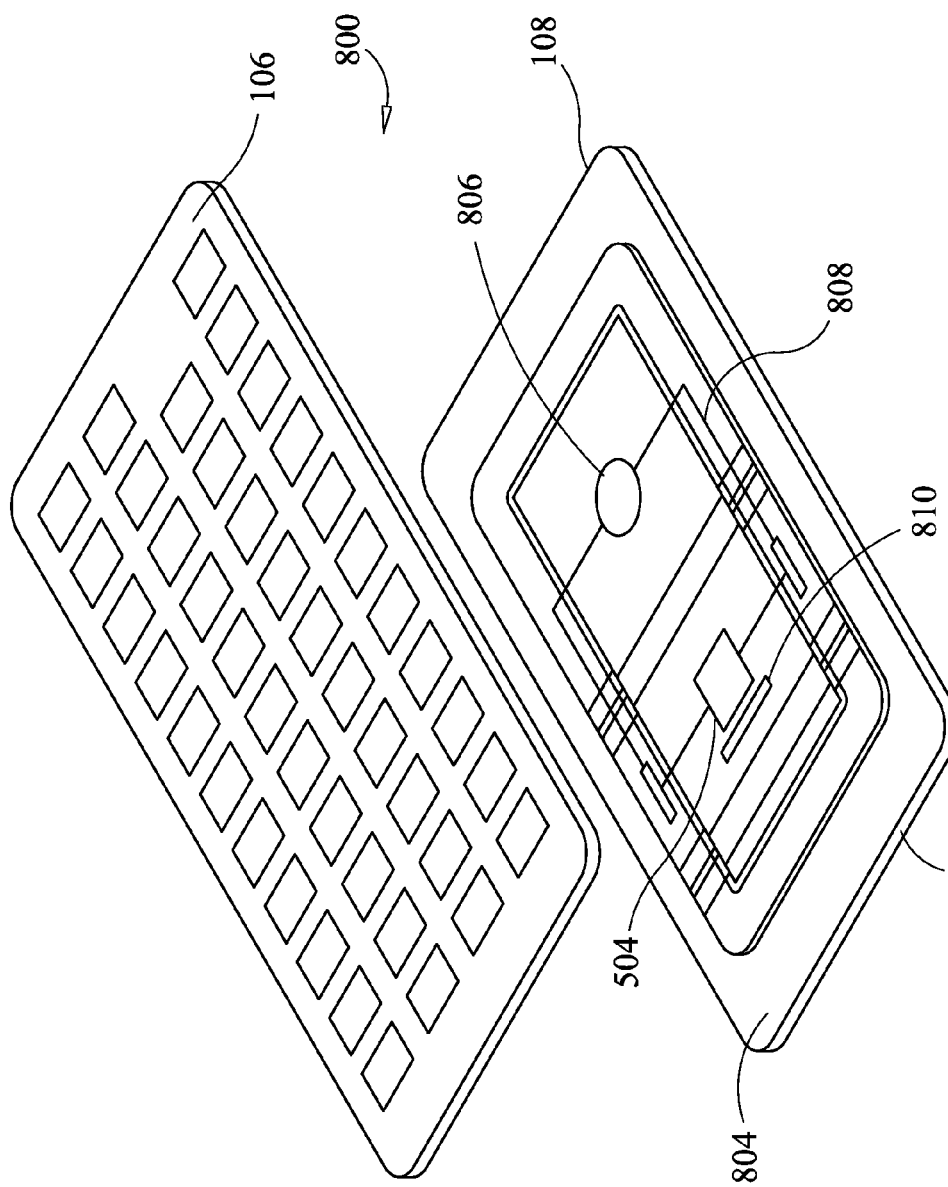

FIG. 9 is a partial cut-away view of the game apparatus according to an embodiment of the present invention.

DETAILED DESCRIPTION OF THE PREFERRED EMBODIMENT

The following discussion describes in detail an embodiment of the game apparatus (and several variations of that embodiment). This discussion should not be construed, however, as limiting the invention to those particular embodiments, practitioners skilled in the art will recognize numerous other embodiments as well. For definition of the complete scope of the invention, the reader is directed to the appended claims.

Turning now descriptively to the drawings, in which similar reference characters denote similar elements throughout the several views, FIGS. 1 through 8 illustrate the game apparatus, system and method of the present invention indicated generally by the numeral 100.

Figure 1:
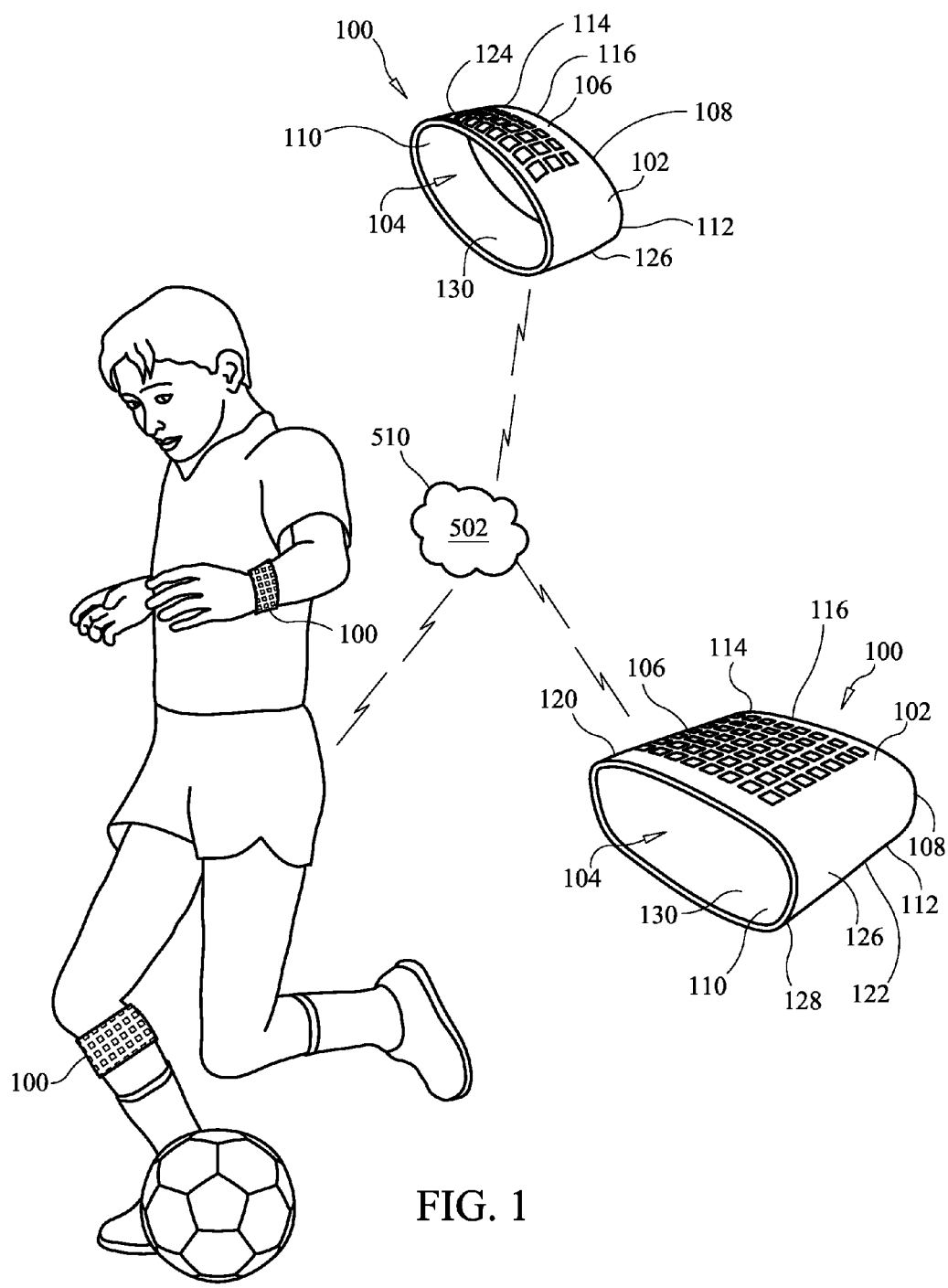
FIG. 1 is an illustrative view of the game apparatus according to an embodiment of the present invention.

FIG. 1 is an illustrative view of the game apparatus 100 according to an embodiment of the present invention. As shown in FIG. 1, the game apparatus 100 comprises of a flexible band 102 with a primary aperture 104 formed therein, allowing for the game apparatus 100 to be worn. The game apparatus 100 also includes a protective top cover 106 having a smooth contour with no sharp edges that is the same contour and shape as a middle portion 108, and wherein the top cover 106 and middle portion 108 are enclosed by a rear cover 110 forming a housing 112 for the communication means 114 and the varied other electronic elements 116 housed therein, e.g. the electronic circuit assembly 118, antenna 120, power supply 122 and communication means 114, all positioned on an upper portion 124 of the flexible band 102.

The middle portion 108 and the protective top cover 106 of the invention may have anyone of the following shapes: circular, oblong, or rectangular, an irregular geometric shape or any other shape that is well known and used in the arts. Said protective top cover 106 protects the middle portion 108 and the varied electronic elements 116 positioned within the housing 112. As such, the protective top cover 106 is formed from a semi-rigid material to prevent breakage, damage, and injury to the player. As mentioned supra, the communication means 114 uses anyone or more of the following wireless communications: radio transmissions, microwave transmissions, broadband wireless data transmissions and/or satellite transmission, using anyone or more of the following wireless protocol: Blue Tooth, Zigbee, 802.11 series, RFID tags or any other short range wireless protocol that is well known and used in the arts and other future short range wireless protocol suitable for transmitting data over a short distance.

The primary aperture 104 receives the player's body parts, e.g. wrists, calves, arms, thighs, etc. and is sized to fit the player's body parts and/or an article of clothing which may comprise of anyone or more of the following: a belt, an ankle band, headband and or a thigh band. In one embodiment of the invention that is not shown herein, the flexible band 102 also includes an extended flap 126, which is provided with closing means 128 on an underside 130 of the extended flap 126, used to secure the game apparatus 100 to a select portion of the player's body, e.g. the wrist, upper arms, calf, or knee, or to a belt. The closing means 128 may include cooperating closing elements 132 (not shown), including a plurality of miniature monofilament hook elements 134 (not shown), cooperating with a plurality of miniature monofilament loop elements 136 (not shown), or any other closing means 128 suitable for detachably securing and unsecuring fabrics or materials. In that embodiment of the invention, the monofilament hook elements 134 (not shown), are affixed to an upper surface 138 (not shown), of the underside 130 of the extended flap 126, while the monofilament loop elements 136 (not shown), are affixed to the flexible band's upper portion 124, or vice versa, to detachably secure the game apparatus 100 to the player's body parts or a belt.

Figure 4:
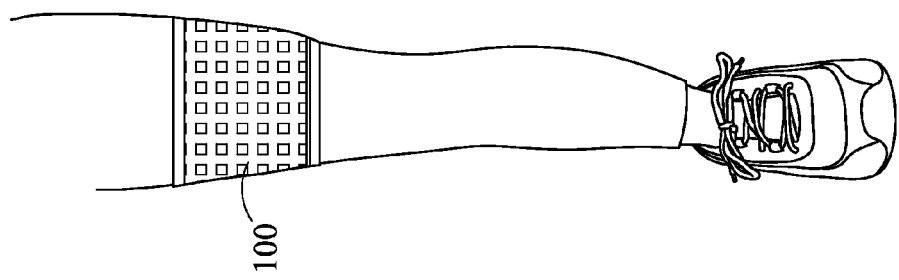
FIGS. 2-4 show illustrative views of different embodiments of the present invention.
Figure 3:
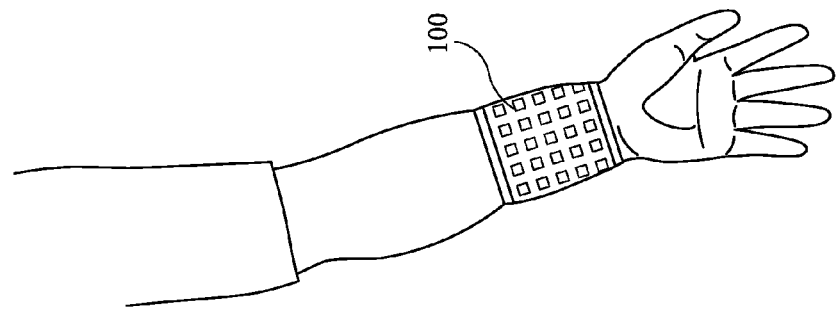
Figure 2:
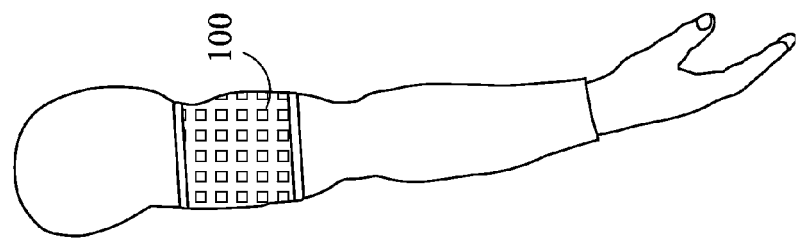

FIGS. 2-4 show illustrative views of different embodiments of the present invention. As seen in FIGS. 2-4, illustratively, the game apparatus 100 may be worn independently as anyone of the following: an armband, wristband, thigh band. The game apparatus 100 may also be worn as an ankle band, neckband, knee band, or with a belt or in any other form on the wearer's body that facilitates easy access and reporting.

FIGS. 5 & 6 show an illustrative view of a system 500 according to an embodiment of the present invention and a flowchart illustrating a method 600 for reporting a player's game plays 502, 502' during a game according to an embodiment of the present invention. In that embodiment, at least one player is provided with a game apparatus 100 (step 602) to be worn during a game, which allows each game play 502 to be recorded by the game apparatus' microprocessor 504. It is understood that each player on a team may be provided with the game apparatus 100 such that each player's game plays 502, 502' may be recorded for review. The player's game play 502 information will be routed to the specific PRT 506 for that team, which is synchronized via an encryption key 508 with each team player's game apparatuses 100, 100', 100" being worn during the game. In this manner, each team's game plays 502, 502" information are restricted to that team where the opposing team has no access to that information.

Once the recording session has begun, each game play 502 is recorded by the game apparatus' microprocessor 504, which encrypts the game play 502 forming an encrypted signal 510 containing the game play 502 information for transmission. The game apparatus' microprocessor 504 then transmits the encrypted signal 510 containing the game play 502 information to the system's central processor 512, which routes it to the PRT 506. In an alternate embodiment of the invention, the microprocessor 504 may transmit the encrypted signal 510 containing the game play 502 information directly to the PRT 506. In either event, the central processor 512 and/or the PRT 506 receives the encrypted signal 510 (step 604) containing the game play 502 information as transmitted by the game apparatus 100 being worn by the player during the game.

Fans in the viewing box or at home who elect to participate in the system 500 and method 600 of the invention may use their mobile operating units 514, 514', 514" to provide their fan based input for each player's game play 502. The fans' mobile operating units 514, 514', 514" may include but is not limited to a cell phone, computer, laptop, Blackberry, iPhone, PDA and/or other WLAN communication devices that are known and readily used in the arts to transmit and/or receive wireless communications. These mobile operating units 514, 514', 514" may be customized with a user interface 516 capable of communicating with the system 500, e.g. via a downloadable software application that may be purchased or provided for free. The central processor 512 of the present invention is able to receive encrypted signals 510, 510' from a plurality of fans' mobile operating units 514, 514', 514" communicating via a wireless communication system 518 (not shown), which is preferably a cellular network 520 (not shown).

The encrypted signal 510 containing the game play 502 information originating for the player as transmitted from a fan's mobile operating unit 506 may be encoded with a player's information 522 and/or any other information that may be required to distinguish it from the encrypted signal 510 originating from the player's game apparatus 100 as both information are processed differently by the system 500. For example, the encrypted signal 510 containing the game play 502 information originating for the player as transmitted from a fan's mobile operating unit 506 may already include a marker 524, or the marker 524 may be added by the system 500 of the invention upon receipt of the same.

If the received encrypted signal 510 containing a game play 502 originated from a fan's mobile operating unit 506 (step 606), the central processor 512 and/or the PRT 506 may add a marker 524 to the encrypted signal 510 (step 608), prior to decryption to delineate its origin.

If the received encrypted signal 510 containing a game play 502 did not originate from a fan, the central processor 512 and/or PRT 506 decrypts the encrypted signal 510 (step 610) containing a game play 502 and converts the decrypted signal 526 (not shown), containing the game play 502 information to statistical data 528 (step 612), which is routed to the PRT's display element 530 for display. The PRT 506 may then display the statistical data 528 (step 614) on the PRT's display element 530 in text, visual, graphical or statistical format or any other format that is well known and used in the arts for statistical displays.

In other embodiments of the invention, the PRT 506 and/or the game apparatus 100 include speech recognition means 532 (not shown), comprising of a user interface 516 which includes an audio receiving circuit 534 capable of receiving radio (RF and/or VHF) signals at predetermined frequencies and/or additional hardware complete with circuitry to effectuate the same. In such embodiments, the statistical data 528 may be relayed orally to the coach, player and or other teammates or any other appropriate personnel who are part of the review process.

The game apparatus 100 may be programmed to record game plays 502 for a predetermined length of time which may coincide with the duration of the game, or for shorter or longer sessions. In alternate embodiments of the invention, the game apparatus 100 has a motion sensor 536 that detects the player's movements, which triggers a signal to the game apparatus 100 to start recording the player's game plays 502, 502', 502". The central processor 512 and/or the PRT 506 may be similarly programmed to receive encrypted signals 510 containing game plays 502, 502', 502" to coincide with the game apparatus recording session 538 (not shown). In either event, the central processor 512 and/or the PRT 506 will continue to verify if the recording session 538 (not shown), is complete (step 616), in which event the PRT will return to steps 604-616 until the recording session 538 (not shown), ends.

In alternate embodiment of the invention, the game apparatus 100 is provided with a display element 530 which may be a liquid crystal display ("LCD") or light emitting diode ("LED") type, plasma, touch screen or other types of displays that are well known and used in the arts. The display element 530 may be used to display an incoming transmission from the PRT 506, e.g. an intended game play instruction 540. The display element 530 may be located in the housing 112 where it is electrically connected to the microprocessor 504 and may be programmed to flash a light thereon on receipt of an encrypted signal 510 of an intended game play instruction 540 for execution on the field during a game.

FIG. 7 is a flowchart illustrating an alternate method 600 for reporting a player's game plays 502, 502', 502" during a game according to an embodiment of the present invention. In that embodiment, the system 500 and method 600 of reporting the game plays 502, 502', 502" for a player comprises of providing a ball 542, which includes an identification tag 544 (step 702) that utilizes radio transmissions for wireless communications with the game apparatus 100 being worn by the player during the game, and wherein the identification tag 544 is used for tracking a plurality of players' game plays 502, 502', 502" during the game that are made in conjunction with the ball 542 and read by a wireless reader 546 (not shown), within the game apparatus 100, forming an encrypted signal 510 containing the game play 502 information for the player for transmission to the PRT 506 and/or central processor 512. As such, each time a player touches or makes contact with the ball 542, the wireless reader 546 (not shown), within the game apparatus 100 reads the information from the ball's identification tag 544. The wireless reader 546 (not shown), may also be located on or off the field, on the sidelines or at a nearby location, allowing the coach and/or player(s) to obtain a perspective of where the player was located when contact with the ball 540 was made.

In this embodiment PRT 506 and/or central processor 512 will follow steps 704-716 which are identical to steps 604-616 of FIG. 6 where the system 600 receives (step 704) and decrypts the encrypted signal 510 (step 710) containing the game play 502 information for the player in the same manner as shown in steps 604-616 of FIG. 6, converting the decrypted signal 526 (not shown), containing the game play 502 information (step 712) into statistical data 528 (not shown), for display on the PRT's display element 530. The PRT 506 may then display the statistical data 528 (step 714) on the PRT's display element 530 in text, visual, graphical or statistical format or any other format that is well known and used in the arts for statistical displays. Fans may similarly participate in this embodiment of the system 500 and method 600 of the invention wherein the system 500 of the invention will follow steps 704-716 which are identical to steps 604-616 of FIG. 6.

In an alternate embodiment, the system 500 and method 600 of reporting the game plays 502, 502', 502" for a player comprises of equipping the game apparatus 100 being worn by the player during the game with the identification tag 544 instead of the ball 540. In this embodiment of the invention, the identification tag 544 is used for tracking each game play 502, 502' for the player, which is transmitted as an encrypted signal 510 containing the game play 502 information for the player to at least one wireless reader 546 that may be located on or off the field. The system 500 operates in an identical manner as steps 604 606 of FIG. 6, where the encrypted signal 510 containing the game play 502 information for the player may be routed to the PRT 506 or central processor 512, where it is received (step 604), decrypted (step 610) and converted into statistical data 528 (step 614) for display on the portable remote terminal's display element 530.

FIG. 8 is an illustrative view of the electronic circuit assembly 800 of the game apparatus 100 according to an embodiment of the present invention. The circuit 802 is comprised of a circuit board 804, having a power source 806 and microprocessor 504 positioned thereon. Conventional wires 808 connect the circuit board 804 with the microprocessor 504. Preferably, the circuit board 804 is formed from a polyimide film which is flexible yet can remain stable in a wide range of extreme temperatures, e.g. Kapton®. However, the circuit board 804 may be formed from silicon, fiberglass, Mylar, or other suitable materials that are well known and used in the arts. The circuit board 804 is small enough to be contained within the housing 112 of the middle portion 108 of the game apparatus 100. An antenna 810, which may include a GSM or GPS antenna 810, is electrically connected to the microprocessor 504 on the circuit board 804 or alternatively imbedded within the microprocessor 504. In yet another embodiment of the invention, the antenna 810 may be incorporated within a wiring harness 812 (not shown), or affixed separately to the upper portion 124 of the flexible band 102.

The game apparatus 100 includes communication means 114 for the receipt and transmissions of wireless communications through a wireless communication system 518 (not shown), which is preferably a cellular network 520 (not shown). Said communication means 114 may include but is not limited to Blue Tooth, ZigBee, 802.11 series, or any other short range wireless protocol that is well known and 'used in the arts and other future short range wireless protocol suitable for transmitting and receiving data over a short distance. The communication means 114 may comprise of a transceiver, e.g. a ZigBee transceiver, with integrated radio and shared antenna 810, or direct conversion receivers; digital radio receivers; super heterodyne receivers; or any other receivers or transceivers that are well known and used in the arts.

Upon receipt of the player's game play 502, the microprocessor 504 encrypts the game play 502 forming an encrypted signal 510 containing the player's game play 502 information, and transmits the encrypted signal 510 containing the player's game play 502 information to the PRT 506 via the wireless communications system 518.

FIG. 9 is a partial cut-away view of the game apparatus 100 having a circuit assembly 700 contained therein. The circuit 802 is comprised of a circuit board 804, having a power source 806 and microprocessor 504 positioned thereon. Conventional wires 808 connect the circuit board 804 with the microprocessor 504. Preferably, the circuit board 804 is formed from a polyimide film which is flexible yet can remain stable in a wide range of extreme temperatures, e.g. Kapton®. However, the circuit board 804 may be formed from silicon, fiberglass, Mylar, or other suitable materials that are well known and used in the arts. The circuit board 804 is small enough to be contained within the housing 112 of the middle portion 108 of the game apparatus 100 which is enclosed within the rear cover 110. The antenna 810 is electrically connected to the microprocessor 504 on the circuit board 804 or alternatively imbedded within the microprocessor 504. Alternatively, the antenna 810 may be incorporated within a wiring harness 812 or affixed separately to the upper portion 124 of the flexible band 102.

The game apparatus 100 includes communication means 114 for the receipt and transmissions of wireless communications through a wireless communications network 716. Upon receipt of an encrypted signal 134 for an intended game play, the microprocessor 504 of the game apparatus 100, decrypts the encrypted signal 134, sends an alarm signal 143 to the alarm notification means 340 of the receipt of the incoming transmission, causing for example a vibration of the game apparatus 100, thereby alerting the player of the received intended game play. The player may activate the displaying means 140 by using the activation switch 138 to view the intended game play on the display element 105 which displays either a text message and/or a visual display for a predetermined period of time, e.g. '10 seconds.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An apparatus for improving communications during a sporting event comprising of:
   (a) a flexible band with a primary aperture formed therein allowing for the game apparatus to be worn, and including a protective top cover having a smooth contour, which is of the same proportion as a middle portion, with no sharp edges, and wherein said top cover and middle portion are enclosed by a rear cover forming a housing for the game apparatus' electronic circuit assembly, antenna, power supply and communication means housed therein, and wherein the top cover, middle portion and housing are all positioned on an upper portion of the flexible band;
   (b) said electronic circuit assembly further comprising of a circuit board having a microprocessor positioned thereon and electrically connected to said communication means, wherein said microprocessor records each game play and encrypts the recorded game play forming an encrypted signal containing the game play information for transmission; and
   (c) said communication means for transmitting the encrypted signal containing the game play information to a central processor or a portable remote terminal, where the player's game play statistics are generated from the game play information and stored thereon, with a statistical display routed to the portable remote terminal's display element.

2. The game apparatus of claim 1, wherein said game apparatus is used for at least one of the following games: basketball, baseball, soccer, volleyball, football, hockey, tennis, golf, horse racing, boxing, wrestling.

3. The game apparatus of claim 1, wherein said game play may include but is not limited to: shooting a ball through a hoop, dribble, a layup, a dunk, scoring, hitting a ball with a club, a strike, a homerun, running to base, scoring a goal, a kick, running with a ball, running alongside a ball, running in front of a ball, running behind a ball, passing a ball, trip, fall, a spike, a volley, hit, a punt, hitting a puck, a stroke, a putt, a box, a jab, making contact with a ball.

4. The game apparatus of claim 1, wherein the encrypted signal containing the game play information includes any one or more of the following: game play information as transmitted by the game apparatus or an encrypted signal containing a player's game play from a mobile operating unit.

5. The game apparatus of claim 1, wherein the game apparatus may be worn independently as anyone of the following: a wristband, ankle band, neckband, armband, waistband, knee band, calf band, thigh band or with a belt.

6. The game apparatus of claim 1, wherein said top cover is formed from a semi-rigid material for preventing breakage, damage and injury to the wearer.

7. The communication means of claim 1, wherein said game apparatus' communication means communicates with an identification tag, positioned within a ball, used for tracking a plurality of players' game plays during a game that are made in conjunction with the ball.

8. The game apparatus of claim 1, wherein the middle portion and the protective top cover have anyone of the following shapes: circular, oblong, or rectangular.

9. The game apparatus of claim 1, wherein said game apparatus includes a display element for displaying an intended game play instruction or the game play statistics in any one or more of the following formats: text, visual, graphical or statistical.

10. The game apparatus of claim 1, wherein the primary aperture for receiving any one or more of the following: an individual's body parts and an article of clothing.

11. The game apparatus of claim 10, wherein the article of clothing comprises of any one or more of the following: a belt, ankle band, headband, thigh band.

12. The game apparatus of claim 1, further comprising of an identification tag used for tracking each game play during a game, which is transmitted as an encrypted signal containing the player's game play information to a central processor or the portable remote terminal.

13. The game apparatus of claim 4, wherein the encrypted signal containing the game play from the mobile operating unit includes a marker or an indicator identifying its source.

14. The game apparatus of claim 1, wherein the game apparatus includes speech recognition means for publishing the game play statistics in audio.

15. A method for reporting a player's game plays during a game comprising:
   (a) providing at least one player with a game apparatus worn by the player during a game, wherein said game apparatus' microprocessor records each game play and encrypts the recorded game play forming an encrypted signal containing the game play information for transmission to a central processor or a portable remote terminal;
   (b) receiving another encrypted signal containing game play information for the player from a fan's mobile operating unit;
   (c) decrypting the encrypted signal containing the game play information received from the fan's mobile operating unit;
   (d) converting the decrypted signal containing the game play information into statistical data for the player; and
   (e) routing the statistical data for the player to the portable remote terminal's display element.

16. The method of claim 15, wherein said game play may include but is not limited to: shooting a ball through a hoop, dribble, a layup, a dunk, scoring, hitting a ball with a club, a strike, a homerun, running to a base, scoring a goal, a kick, running with a ball, running alongside a ball, running in front of a ball, running behind a ball, passing a ball, trip, fall, a spike, a volley, hit, a punt, hitting a puck, a stroke, a putt, a box, a jab, making contact with a ball.

17. The method of claim 15, wherein the statistical data may be displayed in any one or more of the following format: text, visual, graphical and statistical format.

18. The method of claim 15, further comprising adding a marker to the encrypted signal containing the game play information for the player as transmitted from the fan's mobile operating unit.

19. The method of claim 15, further comprising providing a ball, which includes an identification tag that utilizes radio transmissions for wireless communications with the game apparatus being worn by the player during the game, and wherein the identification tag is used for tracking a plurality of players' game plays during the game that are made in conjunction with the ball and read by the game apparatus, forming an encrypted signal containing the game play information for the player for transmission to the portable remote terminal or central processor.

20. The method of claim 19, further comprising providing the portable remote terminal for receiving and decrypting the encrypted signal containing the game play information for the player, converting the decrypted signal containing the game play information into statistical data for display on the portable remote terminal's display element.

21. The method of claim 15, further comprising providing an identification tag for the game apparatus being worn by the player during the game, that utilizes radio transmissions for wireless communications with a wireless reader, wherein the identification tag is used for tracking each game play for the player, which is transmitted as the encrypted signal containing the game play information for the player.

22. The method of claim 21, wherein the encrypted signal containing the game play information for the player is routed to the central processor or portable remote terminal, where it is decrypted and converted into statistical data for display on the portable remote terminal's display element.

23. A system for reporting a player's game plays during a game comprising:
   (a) a game apparatus provided to at least one player that is worn by the player during a game, wherein said game apparatus' microprocessor records each game play and encrypts the recorded game play forming an encrypted signal containing the game play information for transmission to a central processor or a portable remote terminal;
   (b) communication means for receiving another encrypted signal containing the game play information for the player from a fan's mobile operating unit;
   (c) said microprocessor for decrypting the encrypted signal containing the game play information received from the fan's mobile operating unit, converting the decrypted signal containing the game play information into statistical data for the player; and
   (d) said communications means for routing the statistical data for the player to a portable remote terminal for displaying the statistical data on the portable remote terminal's display element.

24. The system of claim 23, wherein the game play may include but is not limited to: shooting a ball through a hoop, dribble, a layup, a dunk, scoring, hitting a ball with a club, a strike, a homerun, running to a base, scoring a goal, a kick, running with a ball, running alongside a ball, running in front of a ball, running behind a ball, passing a ball, trip, fall, a spike, a volley, hit, a punt, hitting a puck, a stroke, a putt, a box, a jab, making contact with a ball.

25. The system of claim 23, wherein the statistical data may be displayed in any one or more of the following format: text, visual, graphical and statistical format.

26. The system of claim 23, further comprising a marker added to the encrypted signal containing the game play information for the player as transmitted from the fan's mobile operating unit.

27. The system of claim 23, further comprising a ball, which includes an identification tag that utilizes radio transmissions for wireless communications with the game apparatus being worn by the player during the game, and wherein the identification tag is used for tracking the game plays during the game that are made in conjunction with the ball, which are transmitted to the game apparatus forming an encrypted signal containing the game play information for the player that is routed to the portable remote terminal or central processor.

28. The system of claim 23, further comprising the portable remote terminal for receiving and decrypting the encrypted signal containing the game play information for the player by, converting the decrypted signal containing the game play information into statistical data for display on the portable remote terminal's display element.

29. The system of claim 23, further comprising an identification tag included in the game apparatus being worn by the player during the game, that utilizes radio transmissions for wireless communications with a wireless reader, wherein the identification tag is used for tracking each game play for the player, which is transmitted as the encrypted signal containing the game play information for the player to at least one wireless reader.

30. The system of claim 23, wherein the wireless reader routes the encrypted signal containing the game play information for the player, which is routed to the portable remote terminal, where it is decrypted and converted into statistical data for display on the portable remote terminal's display element.

* * * * *